United States Patent

Rich, Jr.

[15] 3,643,995
[45] Feb. 22, 1972

[54] SADDLE SUPPORT MEANS

[72] Inventor: Maurice E. Rich, Jr., Memphis, Tenn.
[73] Assignee: Troxel Manufacturing Company, Moscow, Tenn.
[22] Filed: Nov. 3, 1969
[21] Appl. No.: 873,412

[52] U.S. Cl. .................................................297/209, 297/DIG. 9
[51] Int. Cl. .................................................................B62j 1/02
[58] Field of Search .....................297/195, 211, 209, 208; 267/60, 61; 188/102; 285/109

[56] References Cited

UNITED STATES PATENTS

| | | |
|---|---|---|
| 962,443 | 6/1910 | Loudenclos ............................ 267/132 |
| 1,457,241 | 5/1923 | Williams ................................ 267/132 |
| 1,606,381 | 11/1926 | Persons ................................ 297/211 X |
| 2,467,676 | 4/1949 | Labine .................................. 297/211 |
| 3,466,086 | 9/1969 | James et al. .......................... 297/209 |
| 3,467,415 | 9/1969 | Sandor .................................. 287/109 |
| 3,481,628 | 12/1969 | Brilando et al. ....................... 297/209 |

Primary Examiner—James T. McCall
Attorney—John R. Walker, III

[57] ABSTRACT

Assembly for supporting an elongated bicycle saddle or seat adjacent the rearward end. The assembly has an inverted U-shaped brace including a pair of elongated legs each having an elongated compression spring externally encircling the lower end thereof, to provide a more comfortable ride particularly over a bumpy or rough surface.

13 Claims, 5 Drawing Figures

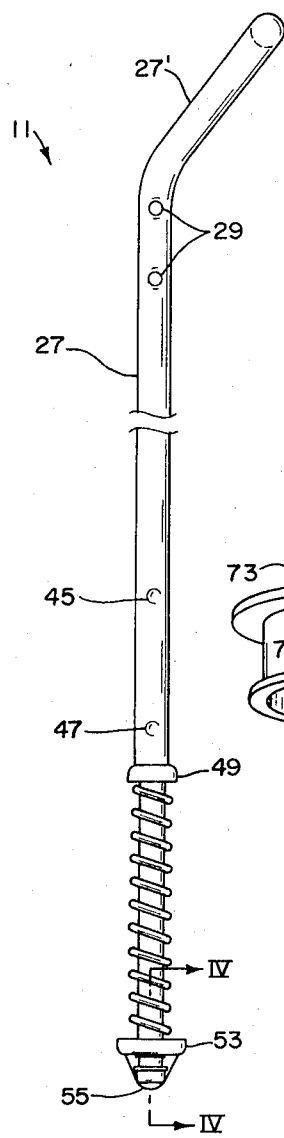
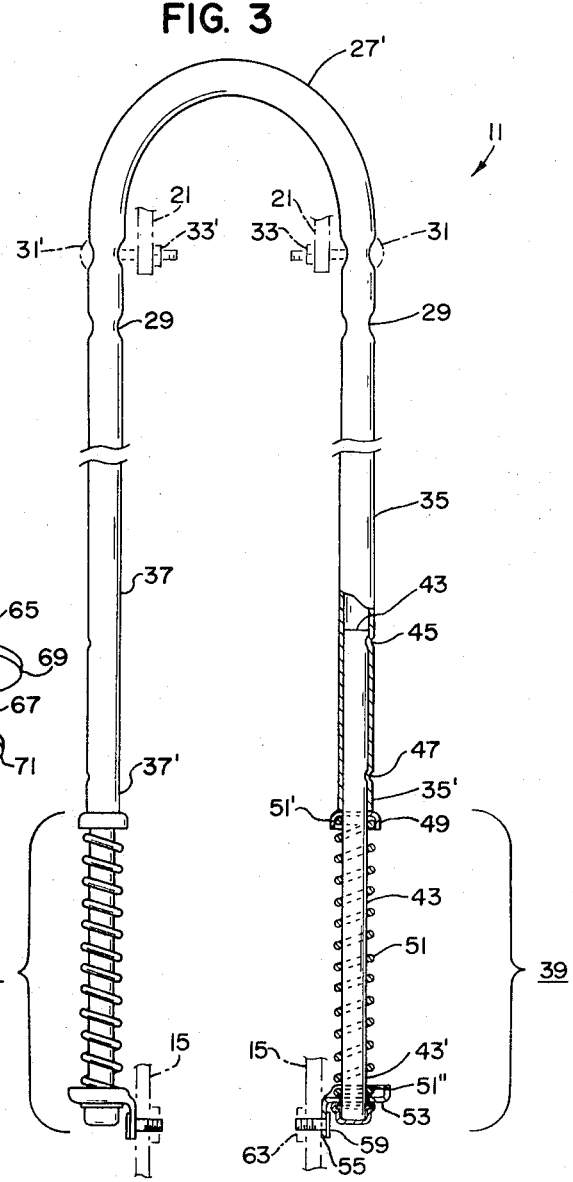
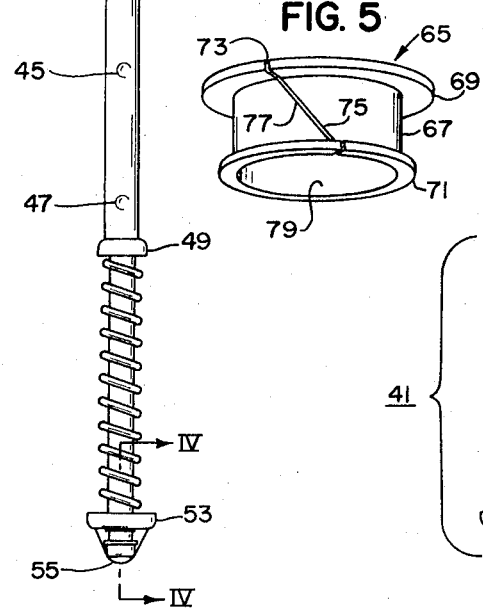
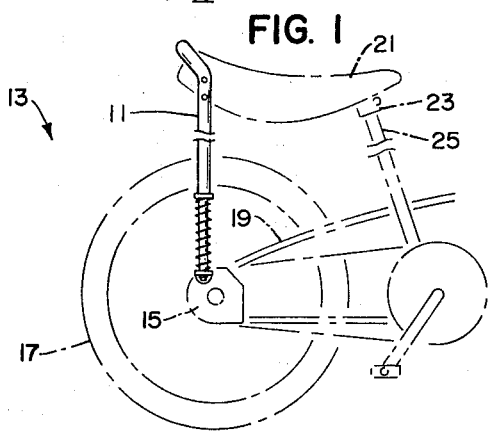
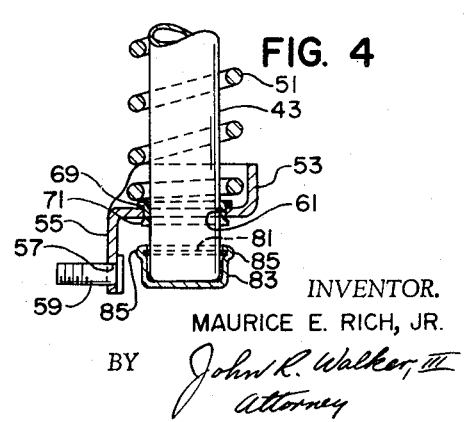
INVENTOR.
MAURICE E. RICH, JR.
BY John R. Walker, III
Attorney

SADDLE SUPPORT MEANS

BACKGROUND OF THE INVENTION

1. Field of the Invention

Supports for elongated bicycle seats of the "Banana Seat" type.

2. Description of the Prior Art

Typical supports for an elongated bicycle saddle or seat are rigid tubular legs providing no up or down movement of the saddle. This causes the rider to experience considerable discomfort when riding over a bumpy or rough surface. This was recognized by James et al., U.S. Pat. No., 3,466,086 when he first introduced a spring support assembly for this type saddle which included "telescopically mounted legs including sleeves having springs therein so that a springy action is provided the rider." The James et al. device functions as described; however, certain problems are encountered in practicing his invention, i.e., the telescoping sections of the legs having metal to metal contact and the difficulty experienced in removing all of the weld flash from inside the tubular telescoping section tends to cause undue friction and/or binding between the two telescoping sections obviating smooth action in working up and down.

SUMMARY OF THE INVENTION

The present invention is directed towards overcoming the heretofore-mentioned and other disadvantages in prior supports for elongated bicycle seats or saddles. One of the objects of the present invention is to provide a smooth acting rearward support assembly for a bicycle banana seat having pivotable action attaching the forward end of the saddle to the usual adjustable post of the bicycle, and to provide such an assembly which is economical to manufacture and has a minimum number of parts. The assembly includes an inverted U-shaped brace including a pair of elongated legs, each having an elongated compression spring externally encircling the lower portion thereof so that a springy or smoother ride is provided the rider. An important feature of subject invention is a "Teflon" bushing which is used between the moving surfaces to reduce friction and accordingly, provides a smooth acting mechanism for the up and down motion of the rearward portion of the bicycle saddle.

BRIEF DESCRIPTION OF THE DRAWING

FIG. 1 is a fragmentary view of of the rearward portion of a bicycle incorporating the saddle support assembly of the present invention.

FIG. 2 is an enlarged side elevational view of the saddle support assembly with the spring slightly compressed to depict a displacement of the moving members.

FIG. 3 is an enlarged rear elevational view of the saddle support assembly.

FIG. 4 is an enlarged sectional view taken as on the line IV—IV of FIG. 2.

FIG. 5 is an enlarged perspective view of the "Teflon" bushing.

DESCRIPTION OF THE PREFERRED EMBODIMENT

The saddle support means 11 of the present invention is shown mounted on the rearward portion of a typical bicycle 13 in FIG. 1 wherein it will be seen the bicycle 13 includes the usual support structure 15 on either side of the rear wheel 17 adjacent the central portion thereof and which is usually performed platelike members that are integrally attached to a frame 19. It will be understood that saddle support 11 is intended for use in supporting an elongated saddle or seat 21 which the assignee of the present invention and others presently manufacture and which said assignee refers to its seat by the trademark "Banana Seat." Thus, when the term "elongated bicycle saddle" or "elongated bicycle seat" is used in the present application, it is deemed to mean that particular type of seat or saddle illustrated and others similar to it and which is referred to by the name "Banana Seat," among other names. Additionally, seat 21 is of the type having a forward pivot assembly 23 adjacent the usual adjustment post 25.

An inverted U-shaped upper tubular member 27, being formed of thin wall tubular steel or the like, has an upper bend portion 27' canted rearwardly. A plurality of opposing pairs of transversely drilled apertures 29 in member 27, with the axis of the drill parallel to the lateral axes of saddle 21, are used to removably attach saddle 21 thereto. Attaching bolts 31, 31' are inserted through the apertures 29, 29 and secured with a pair of nuts 33, 33'. The plurality of apertures 29 on each leg 35, 37 forms a straight line commencing at the uppermost aperture 29 positioned below and adjacent the canted bend and extends downwardly. Attaching the saddle 21 to the lower orientated apertures 29 lowers the rearward end of the saddle 21 and conversely, attaching the saddle 21 to the higher orientated apertures 29 raises the rearward end of the saddle 21. This adjustment features is intended to be used in conjunction with the adjustable post 25 for obtaining the desired height for various size riders. In addition it makes it possible to tilt the saddle 21 fore and aft adding to the comfort by providing better weight distribution of the rider. The U-shaped member 27 includes two extending legs 35, 37 which straddles the wheel 17 with each having holes as described above and an identical assembly attached at the lower portion 35', 37' thereof. The remaining construction pertains to two identical lower assemblies 39 and 41 and the following description of assembly 39 should be understood to pertain also to assembly 41.

An elongated circular rod 43, formed of steel or the like, is telescoped into the open end 35' of leg 35 and is fixedly attached as by staking or the like leaving staking impingement dimples 45, 47. An annular cuplike washer 49 with the inner diameter of the concentric hole thereof substantially conforming to the outer diameter of circular rod 43 slidably encircles rod 43 with the cuplike side facing downwardly and moved upwardly along rod 43 until it is stopped by the flat side encountering the lower end 35' of legs 35. An elongated compression springs 51 having an inner diameter slightly greater than the outer diameter of rod 43 and having an outer diameter slightly less than the inner diameter of the wall to wall dimension of the cup side of cuplike washer 49 is slidably slipped over rod 43 and moved along until the one end 51' encounters washer 49 and the inner wall of the cuplike side of washer 49 which encircles the outer diameter of the spring 51 and acts as a seating means for spring 51. The length of spring 51 is such that when positioned as described above, the other end 51" terminates substantially at the lower end 43' of rod 43 when spring 51 is in a relaxed state. The upper and lower ends 51', 51" respectively of springs 51 are formed so that they are flat or are lying in a plane which is perpendicular to the longitudinal axis of the spring 51 so that spring 51 will not cant or bind with rod 43 during relative movement and compression in normal operation. An annular cuplike member 53 is provided, which includes a chamfered lug 55 projecting outwardly from the center having an aperture 57 substantially centered therein. The lug 55 is turned or bent down substantially 90° in relation to the annular plane of the cup portion and has a weldbolt 59 inserted through the aperture 57 and fixedly attached, as by welding or the like, for resiliently securing the lower end 43' of the rod 43 to the bicycle hub support structure 15. A second aperture 61 in the cuplike member 53 is concentrically centered between the substantially vertical walls of the cuplike portion and has a diameter slightly greater than the outside diameter of the rod 43, as best viewed in FIG. 4. The wall to wall dimension of the cuplike portion of the member 53 is slightly greater than the outside diameter of the spring 51 so that the lower end 51" of spring 51 may seat or rest on the horizontal bottom inside of the cuplike portion and the substantially vertical walls of cuplike member 53 may partially encircle the outer diameter of the lower end 51" of the spring 51. The cuplike member 53 is removable secured to the bicycle hub support structure 15 by the weldbolt 59 and a nut 63.

FIGS. 2 and 4 show the compression spring 51 slightly compressed which displaces the moving parts for clarity. As can readily be seen in FIGS. 2 and 4, when spring 51 is compressed, rod 43 moves downwardly, slipping through apertures 61. In order to eliminate any metal to metal contact which tends to obviate smooth action between working surfaces a nylon, teflon or the like bushing 65 is inserted in the aperture 61 and provides a durable self-lubricating smooth acting bushing between the rod 43 and the cuplike member 53, as best viewed in FIGS. 4 and 5.

The bushing 65 has a flat cylindrical shape proportioned so that the diameter exceeds the length and includes upper and lower annular concentric flanges 69, 71 respectively in a plane and which projects outwardly from the center which is perpendicular to the cylinder wall 67. A slit 73 extending from the upper flange 69 across the cylinder wall 67 and through the lower flange 71 is made diagonal to the circumferential axis of the bushing 65. The diagonal slit 73 severs the cylinder wall 67, forming two edges 75, 77 which when made to overlap, reduces the overall diameter of the bushing 65 sufficient to enable it to be passed through the aperture 61 in the cuplike member 53. When bushing 65 has been positioned as described above, it may be relaxed and will resiliently expand, causing edges 75, 77 to no longer overlap but take a relationship preferably abutting one against the other. This places the flange 69 above the aperture 61 and flange 71 below with the outer cylinder wall 67 circumferentially engaging the portion of member 53 providing aperture 61. In assembling saddle support 11, the compression spring 51 is placed over rod 43. Then, the cuplike member 53 is slipped over the end 43' of rod 43 with the cuplike portion facing upwardly and the lug 55 projecting downwardly and with the inner wall 79 of the bushing 65 encircling the lower end 43' of the rod 43. The two cuplike members 49, 53 maintain a concentric relationship of the circumference of spring 51 with the rod 43. Any conventional holding method may be used to preclude the above assemblage from slipping off rod 43. I prefer an annular speed nut 81, having a performed cap portion 83 preferably formed of aluminum or the like and radially crimped as at crimp 85, which is pressed over the protruding end 43' of rod 43.

In mounting the saddle support 11, an opposing pair of apertures 29, 29 are selected for the correct height and the saddle 21 is removable secured to the upper portion of the tubular member 27 with attaching bolts 31, 31' and nuts 33, 33'. Each of the legs 35, 37 of the saddle support 11 is removably attached to the bicycle hub support structure 15 using the weldbolt 59 and the nut 63. In the operation of the saddle support 11, the weight of the rider will compress the spring 51 displacing the lower end 43' of the rod 43 to a position which is substantially depicted in FIGS. 2 and 4. While riding the bicycle 13 over a rough or bumpy surface, the shock of a bump is transmitted through the wheel 17 to the bicycle hub support structure 15 which causes the compression spring 51 to compress, thus absorbing a great portion of the shock which makes for a more comfortable ride.

Although the invention has been described and illustrated with respect to a preferred embodiment thereof, it is to be understood that it is not to be so limited since changes and modifications may be made therein which are within the full intended scope of this invention.

I claim:

1. In a bicycle of the type including an elongated saddle pivotally supported adjacent the forward end thereof, and including structure adjacent the center of the bicycle wheel; support means for supporting said saddle adjacent the rearward end thereof comprising an inverted U-shaped upper tubular member having a pair of depending legs, a pair of lower assemblies respectively associated with said legs and respectively mounted on said legs and attached to the structure adjacent the center of the bicycle wheel; each of said lower assemblies including a rod having an upper end and a lower end, the upper end of said rod being telescopically received in the lower end of its associated leg, means fixedly attaching said rod to said associated leg with said rod being fixed against movement relative to said associated leg, means fixed relative to said structure movably mounting said leg relative to said structure for permitting vertical movement of said rod and said upper tubular member relative to said structure, and resilient means resiliently supporting said upper tubular member and said leg relative to said structure and said rod being supported by said leg with the lower end of said rod being normally adjacent said means fixed relative to said structure.

2. In a bicycle of the type including an elongated saddle pivotally supported adjacent the forward end thereof, and including structure adjacent the center of the bicycle wheel; support means for supporting said saddle adjacent the rearward end thereof comprising an inverted U-shaped upper tubular member having a pair of depending legs, a pair of lower assemblies respectively associated with said legs and respectively mounted on said legs and attached to the structure adjacent the center of the bicycle wheel; each of said lower assemblies including a rod telescopically received in the lower end of its associated leg, means fixedly attaching said rod to said associated leg, means movably mounting said leg relative to said structure for permitting vertical movement of said rod and said upper tubular member relative to said structure, and resilient means resiliently supporting said upper tubular member and said leg relative to said structure; said means movably mounting said leg comprising an upwardly disposed cuplike member provided with an aperture through which said rod movably extends, said cuplike member including a downwardly turned lug, and bolt means fixedly mounted on said lug for attaching said lug to said structure.

3. The apparatus of claim 2 in which is included a plastic bushing received in said aperture and between said rod and said cuplike member.

4. The apparatus of claim 3 in which said bushing includes an upper flange extending above a portion of said cuplike member and a lower flange extending below a portion of said cuplike member, and in which said bushing is split along a line extending from top to bottom thereof.

5. The apparatus of claim 3 in which is included an upper spring seat encircling said rod and limited in its upper travel thereon by engagement with the lower end of said leg corresponding with said rod, and in which said resilient means includes a compression spring extending between said upper spring seat and said cuplike member in encircling relationship to said rod.

6. The apparatus of claim 5 in which is included a caplike member fixedly mounted on said rod below said cuplike member.

7. Support means for supporting the rearward end of an elongated bicycle seat from a bicycle comprising an inverted U-shaped upper tubular member having a pair of depending legs, a pair of lower assemblies respectively associated with said legs and respectively mounted on said legs, each of said lower assemblies including a rod having an upper and a lower end, the upper end of said rod being telescopically received in the lower end of its associated leg, means fixedly attaching said rod to said associated leg with said rod being fixed against movement relative to said associated leg, mounting means movably attached to said leg for attachment to a bicycle in fixed relationship thereto and for movably mounting said leg relative to a bicycle for permitting vertical movement of said rod and said upper tubular member relative to said bicycle, and resilient means reacting between said mounting means and said tubular member for urging said tubular member upwardly relative to said mounting means to normally position said lower end of said rod adjacent said mounting means.

8. Support means for supporting the rearward end of an elongated bicycle seat from a bicycle comprising an inverted U-shaped upper tubular member having a pair of depending legs, a pair of lower assemblies respectively associated with said legs and respectively mounted on said legs, each of said lower assemblies including a rod telescopically received in the lower end of its associated leg, means fixedly attaching said rod to said associated leg, mounting means movably attached to said leg for movably mounting said leg relative to a bicycle for permitting vertical movement of said rod and said upper tubular member relative to said bicycle, and resilient means reacting between said mounting means and said tubular member for urging said tubular member upwardly relative to said mounting means; said mounting means comprising an upwardly disposed cuplike member provided with an aperture through which said rod movably extends, said cuplike member including a downwardly turned lug, and bolt means fixedly mounted on said lug for attaching said lug to structure on a bicycle adjacent the center of a wheel thereof.

9. The apparatus of claim 8 in which is included a plastic bushing received in said aperture and between said rod and said cuplike member.

10. The apparatus of claim 9 in which said bushing includes an upper flange extending above a portion of said cuplike member and a lower flange extending below a portion of said cuplike member, and in which said bushing is split along a line extending from top to bottom thereof.

11. The apparatus of claim 10 in which is included an upper spring seat encircling said rod and limited in its upper travel thereon by engagement with the lower end of said leg corresponding with said rod, and in which said resilient means includes a compression spring extending between said upper spring seat and said cuplike member in encircling relationship to said rod.

12. The apparatus of claim 11 in which is included a caplike member fixedly mounted on said rod below said cuplike member.

13. In a bicycle of the type including an elongated saddle pivotally supported adjacent the forward end thereof, and including structure adjacent the center of the bicycle wheel; support means for supporting said saddle adjacent the rearward end thereof comprising an inverted U-shaped upper tubular member having a pair of depending legs, a pair of lower assemblies respectively associated with said legs and respectively mounted on said legs and attached to the structure adjacent the center of the bicycle wheel; each of said lower assemblies including a rod telescopically received in the lower end of its associated leg, means fixedly attaching said rod to said associated leg, means movably mounting said leg relative to said structure for permitting vertical movement of said rod and said upper tubular member relative to said structure, resilient means resiliently supporting said upper tubular member and said leg relative to said structure, said means movably mounting said leg comprising spring seat means having an aperture therein through which said rod extends, and a plastic bushing received in said aperture between said rod and said means movably mounting said leg.

* * * * *